United States Patent
Shatwell et al.

[15] 3,663,060
[45] May 16, 1972

[54] WHEELED SAW

[72] Inventors: Donald G. Shatwell, Wilmington; Lester F. Kuzmick, Palos Verdes Estates, both of Calif.

[73] Assignee: Cushion Cut, Inc.

[22] Filed: Mar. 4, 1970

[21] Appl. No.: 16,424

[52] U.S. Cl.................................................299/39, 143/435
[51] Int. Cl........................................................E01c 23/09
[58] Field of Search.................299/39; 143/43 S; 172/15; 173/169, 24; 51/176

[56] References Cited

UNITED STATES PATENTS

| 3,387,891 | 6/1968 | Simms et al. | 299/39 |
| 1,553,845 | 9/1925 | Bardol | 299/39 |
| 1,574,814 | 3/1926 | Hansen | 173/169 X |
| 2,701,134 | 2/1955 | Kcicpera | 299/39 |
| 2,882,977 | 4/1959 | Smith et al. | 172/15 |
| 3,020,812 | 2/1962 | Gross | 299/39 X |

*Primary Examiner*—Ernest R. Purser
*Attorney*—Nilsson, Robbins, Wills and Berliner

[57] ABSTRACT

A wheeled saw for making random cuts in which a rotary saw blade is mounted between the spaced rear wheels of a carriage and having a pivotal forward wheel whereby relatively large movements of the front of the carriage effects relatively small movements of the saw blade enabling the blade to follow random cracks such as would appear in concrete and asphalt. An engine for operating the saw blade is mounted on the carriage and is vertically movable to raise or lower the saw blade from or to a cutting position and to bear on the blade when it is in a cutting position.

9 Claims, 5 Drawing Figures

PATENTED MAY 16 1972

INVENTOR.
DONALD G. SHATWELL
BY LESTER F. KUZMICK

Nilsson, Robbins, Wills & Berliner
Attorneys.

INVENTOR.
DONALD G. SHATWELL
LESTER F. KOZMICK
BY
Nilsson, Robbins, Wills & Berliner
Attorneys.

WHEELED SAW

FIELD OF THE INVENTION

The fields of art to which the invention pertains include the fields of sawing and traveling circular saw machines.

BACKGROUND AND SUMMARY OF THE INVENTION

In the utilization of large expanses of concrete or asphalt surface coverings, such as on roadways, airport runways, and the like, after a period of extended use, cracks develop, generally in a random manner. Such cracks should be sealed so as to prevent further spreading with resultant deterioration of the covering and for safety in use of the surface. Proper sealing requires that the crack be opened and cleaned so that a sealant such as concrete or asphalt can firmly adhere to the sides of the crack. Conventionally, a gas-operated router is used which is equipped with a rotary carbide or hardened steel bit. Work with a router is slow and labor costs are high because of the necessity of frequent bit replacement. Also, the router substantially widens the crack detracting from the ability of the sealant to adhere to the side walls. Also, use of a router requires careful manipulation to follow the paths of the random cracks as closely as possible so as to limit the extent of widening.

The present invention provides a device for opening random cracks which allows the repair of such cracks at a much faster rate than heretofore obtainable. Much thinner and shallower cuts are obtained providing an ample reservoir for the sealant and enabling better adhesion of the sealant to the side walls. The device can be utilized to readily follow any random crack configuration with ease and is constructed so as to allow the use of a diamond rotary blade, greatly increasing the number of feet of crack that can be opened before requiring replacement. To accomplish these results, a wheeled saw is provided having stationary rear wheels and one or more swivel-mounted front wheels which permit the saw to pivot on its rear wheels to thereby closely follow any random crack configuration. By such utilization of a "crazy-wheel" in the front with a rotary saw blade mounted at the rear, relatively large movements of the front of the machine by the operator effect only relatively small movements of the saw blade, allowing accurate disposition of the saw blade in the crack.

In particular, the wheeled saw comprises a carriage, a wheel or wheels for the carriage mounted rearwardly thereof, a wheel mounted forwardly of the carriage and pivotal thereat for turning the carriage on the rear wheel or wheels, and a rotary saw blade mounted rearwardly of the carriage for cutting below the carriage. In specific embodiments, the carriage is supported on a pair of rear wheels and a single front wheel mounted equidistant from each rear wheel. The rotary blade is mounted on an engine which is centered on the blade arbor for equal distribution of weight. The weight of the engine is sufficient to enable the saw blade to cut through the concrete or asphalt and no additional weight is required.

A mechanism is provided for raising and lowering the engine with respect to the carriage whereby to raise and lower the saw blade from and to a cutting position. In particular, the engine is pivotally mounted on the front of the carriage so that it is tilted on its pivotal mount when raised or lowered. The saw blade is mounted so as to always be in full view of the operator and to operate in a cutting position in the vicinity of the axis of rotation of the rear wheels thereby effecting a reduction in turning ratio between the front wheel and the blade.

The engine is raised and lowered by means of a lever and a fulcrum, the fulcrum being rigidly connected to the carriage. Means are provided for securing the lever in one of a plurality of positions with respect to the fulcrum whereby to define a desired cutting position. A handle is secured upright from the carriage, the fulcrum being rigidly secured between the handle and the carriage to provide a sturdy support for the engine when in a desired position. The handle is hollow and provided on one end with a receiving port for cooling liquid and on the other end with a conduit in the form of a rubber tube for conducting cooling liquid to the saw blade.

DETAILED DESCRIPTION

As required, a detailed illustrative embodiment of the invention is disclosed herein. However, it is to be understood that this embodiment merely exemplifies the invention which may take many different forms that are radically different from the specific illustrative embodiment disclosed. Therefore, specific structural and functional details disclosed herein are not to be interpreted as limiting, but merely as a basis for the claims defining the scope of the invention.

Figure 1:
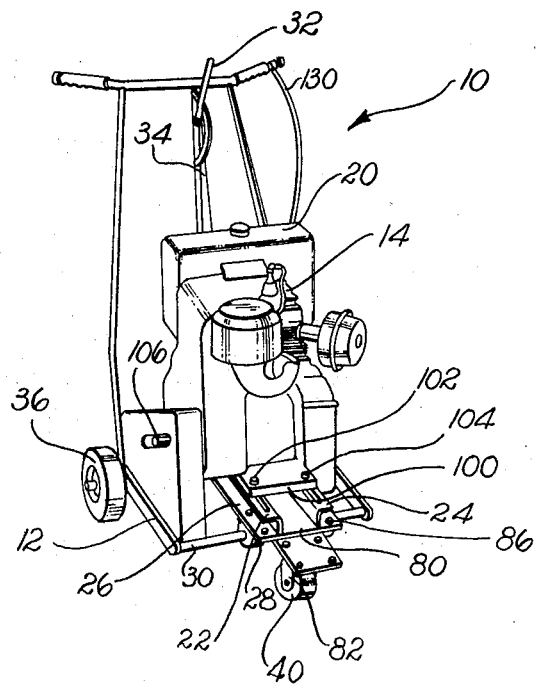
FIG. 1 is a perspective front-side view of a wheeled random cut saw of this invention.

Referring initially to FIG. 1, there is shown a wheeled random cut saw 10 of this invention, including a carriage generally indicated at 12 carrying an engine 14 which, in turn, carries a rotary saw blade 16 on an arbor 18. A 12 horsepower air-cooled engine 14 can be utilized including a gasoline tank 20 strapped thereto to provide a compact unit which can be readily mounted on the carriage 12. The engine 14 is mounted on a pair of angle irons 22 and 24 which, in turn, are carried by a platform 26 pivotally mounted by bearings 28 to a rounded front frame bar 30 of the carriage 12. By such mount, the engine 14 can be tilted forward to raise the saw blade 16 or backward to lower the saw blade 16, tilting being accomplished by means of a locking lever 32 and fulcrum 34 as will be detailed hereinafter.

Figure 2:
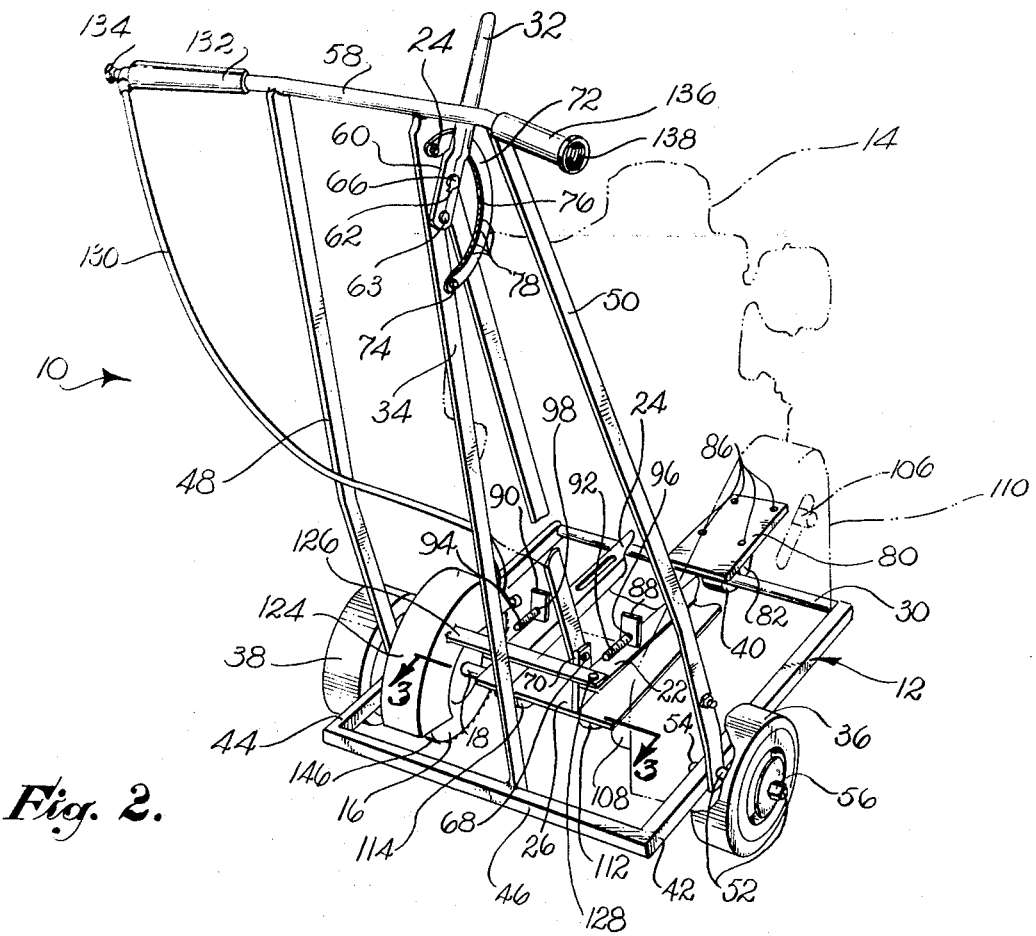
FIG. 2 is a perspective rear-side view of the saw of FIG. 1 with the engine components in shadow, and broken to show details of construction.

The carriage 12 is supported on a pair of rear wheels 36 and 38 (FIG. 2) and by a single forward wheel 40. Referring now to FIG. 2, the manner in which the carriage 12 is supported, and relationship between the fulcrum 34 lever 32 and engine support platform 26 is more clearly shown. The carriage 12 is formed with rigid rectangular side and rear frame bars 42, 44, and 46 and the rounded front frame bar 30. A pair of handle support bars 48 and 50 are disposed on opposite side carriage bars 42 and 44 to extend upright therefrom and are joined to the carriage bars 42 and 44 at their lower ends by means of double ended bolts 52 which also serve as axles for the wheels 36 and 38 and are secured on both ends by lock nuts 54 and 56.

A tubular handle 58 is secured by welding to the other ends of the upright handle support bars 48 and 50 and a rigid bar 34 is welded to and between the handle 58 and the rear frame bar 46 to serve as a brace between these members and as a fulcrum for the lever 32. The lower end 60 of the lever 32 is offset and pivotally connected to the fulcrum 64 by a headed pin 63. The offset lever end 60 defines a pivot opening 62. A lifting bar 64 is pivotally connected to the offset lever end 60 by means of a headed pin 66 secured to that end of the lifting bar 64 and disposed through the pivot opening 62. The lower end of the lifting bar 64 is pivotally connected by a bolt and locking nut 68 to an upright extension 70 of one of the angle bars 22 to thereby suspend the engine platform 26 from the lever 32.

An arched member 72 is disposed with its outer ends straddling the lever-fulcrum pivotal connection pin 63 and is secured to the fulcrum by bolts and nuts 74. The inner curved surface 76 of the arched member 72 is formed with a plurality of notches 78. The surface of the offset lever end 60 which is in contact with the arched member 72 is formed to jut into the notched surface 76 as a locking pawl against downward movement of the lever. Thus, the engine platform 26 can be raised or lowered to any desired position and locked in that position by means of engagement of the lever 32 with the arched member notches 78.

Figure 4:
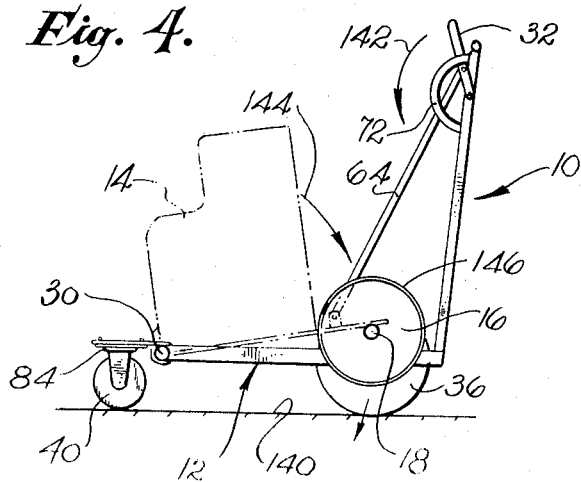
FIG. 4 is a schematic, vertical section view of the saw in a raised position.

Referring to both FIGS. 1 and FIG. 2, the engine platform 26 is formed with a forward overhang 80 secured thereto, such as by welding, which is shown separately in FIG. 2 for clarification. The forward wheel 40 is journelled on a clevis 82 which is connected to a swivel plate 84 (FIG. 4). The swivel plate 84 is connected to the underside of the overhang 80 by means of a plurality of bolts 86 so that the forward wheel 40 swivels freely.

With respect to further details of construction of the random cut saw 10 and referring specifically to FIG. 2, the engine 14 is carried by the angle bars 22 and 24 and bears against a pair of flanges 88 and 90 is provided with a pair of bolts 92 and 94 extending rearwardly therefrom which are disposed to jut through openings 96 and 98 in the upright flanges 88 and 90 to accurately position the engine 14 on the engine platform 26. The engine 14 is also provided with a front bottom plate 100 (FIG. 1) which is bolted to the angle bars 22 and 24 forwardly thereof with bolts 102 and 104 so as to secure the engine 14 in place. By such means the position of the engine is accurately maintained with its weight distribution over the saw arbor 18.

The engine 14 is a standard article of commerce and itself constitutes no novel part of the invention. It is equipped with a driving shaft 106 which is belted to drive a chuck 108 disposed beneath the engine platform 26, the belting being covered by a fender skirt shown in shadow at 110.

Figure 3:
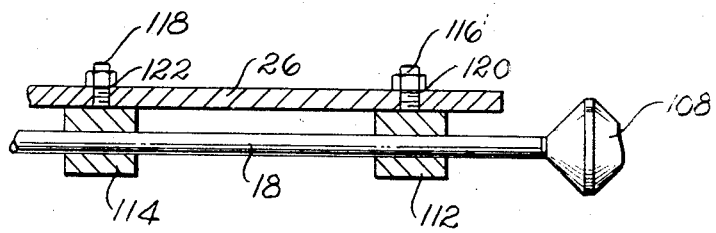
FIG. 3 is a cross-sectional view on line 3—3 of FIG. 2, in the direction of the arrows.

The chuck 108 carries the arbor 18 for the rotary saw 16. The arbor 18 is journalled through a pair of bearings 112 and 114 so that the weight of the engine 14 is distributed along the length of the arbor 18. Referring additionally to FIG. 3, there is schematically illustrated the manner in which the arbor 18 is journalled through the bearings 112 and 114. The bearings 112 and 114 are formed with bolts 116 and 118 which are disposed through openings 120 and 122 defined through the engine platform 26. By such means, the engine 14 can be centered on the arbor 18 for perfect weight distribution.

Referring back to FIG. 2, a blade guard 124 is supported over the top of the blade 16 by means of a support bar 126 welded thereto and bolted at 128 to one of the angle bars 22. The blade guard 124 protects the operator from kickbacks and is provided forwardly with an opening (not shown) into which is secured a rubber tube 130. The tube 130 is connected at its other end to one end 132 of the handle 58 which is hollow, connection being accomplished by means of a finger-tip water control valve 134. The other end 136 of the hollow handle 58 is formed with a hose coupling connection 138. A water line can be connected to the coupling 138 to thereby feed water through the hollow handle 58 and tube 130 to the blade 116. The arrangement illustrated aids in keeping the water hose clear of the saw blade 16, decreasing the chances for accidental severence of the hose.

Figure 5:
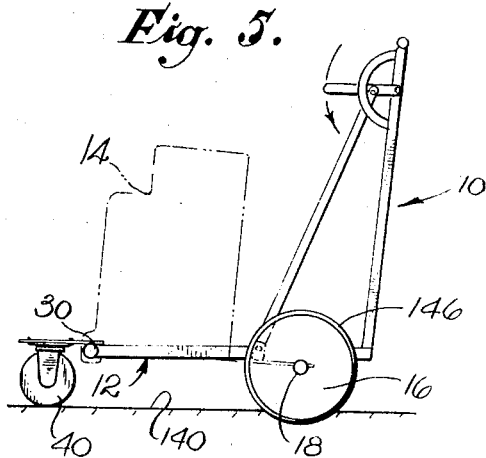
FIG. 5 is a schematic, vertical section view of the saw in a lowered, cutting position.

Referring now to FIGS. 4 and 5, operation of the random cut saw 10 is schematically illustrated. First with respect to FIG. 4, the saw is shown in the position depicted in FIGS. 1 and 2, that is, with the engine 14 tilted forward on its bearings 28. The rotary blade 16 is in its raised position, supported by the lifting bar 64 and locked in place by engagement of the lever 34 with the notched arched member 72. In such condition, the random cut saw 10 can be stored, or can be readily moved from one location to another preparatory to cutting of a concrete, asphalt, or the like surface 140. By moving the lever 32 sideways out of engagement with the notched arched member 72, the lever 32 may be lowered, as indicated by the arrow 142, thereby lowering the lifting bar 64 to tilt the engine 14 rearwardly, as indicated by the arrow 144, which, in turn, lowers the rotary saw 16 into a cutting position as illustrated in FIG. 5. In this position, the weight of the machine bears against the arbor 18 to press the saw blade 16 into the surface 140 to be cut.

The saw blade 16 has a diamond surface 146 for longer life, and one of the advantages of the present construction is that a rotary blade, such as illustrated at 16, can be utilized which can be readily formed with a diamond cutting surface. A saw blade 16 having a diameter of 8 inches and a width of three-eighths inches, rotating at 3,000 rpm will open a crack to a width of three-eighths inch. However, the blade 16 can be replaced with a blade of any desired thickness, up to 1 inch or even wider, or much thinner than three-fourths inch, for any particular requirement. The lever 32 can be locked in any desired position so that a desired depth of cut can be achieved. For sealing purposes, a depth of cut of three-fourths inch is suitable. With the utilization of a diamond rotary saw blade 16 rotating at 3,000 rpm, one blade can saw 30,000 linear feet of concrete. The particular construction illustrated allows the blade 16 to be in full view of the operator at all times enabling rapid alignment of the blade to the particular crack configuration.

By utilizing a front wheel 40 which is swivelly mounted to the front of the machine, and stationary (i.e., not laterally moving) rear wheels 36 and 38, large lateral movements of the front of the machine result in only small lateral movements of the rear part of the machine. The saw blade 16 is mounted to operate in a cutting position in the vicinity of the axis of rotation of the rear wheels 36 and 38 and this is illustrated in FIGS. 4 and 5 where it is seen that the axis of rotation of the arbor 18 overlies the axis of rotation of the rear wheels 36 and 38 when the saw blade 16 is in a cutting position. This allows full advantage of the differential in lateral displacement to be utilized. By using a wheeled random cut saw 10 of this invention, an operator can cut 7 to 10 times faster than by utilizing conventional methods as herein before outlined.

While the saw has been described as having a pivotal front wheel and stationary rear wheels, a reversal of components is also contemplated. Accordingly, the concepts of this invention are applicable to machines in which the stationary wheels are at the front thereof and the pivotal wheel is at the rear. In this case, the saw blade would be disposed at the front of the machine between the stationary wheels.

I claim:
1. A wheeled saw, comprising:
a carriage having a forward end portion and a rear end portion;
a handle for said carriage;
means for disposing said handle at said end portion;
a pair of spaced wheels for the carriage mounted at said rear end portion;
a wheel mounted at said forward portion of the carriage and pivotal thereat for turning said carriage on said spaced wheels;
an engine for operating a rotary saw blade;
means for mounting said engine on said carriage;
an arbor on said engine for mounting a rotary saw blade;
a rotary saw blade having an axis of rotation in said rear carriage portion and mounted on said arbor between said spaced wheels to cut below said carriage; and
means for vertically moving said engine to raise or lower said saw blade from the cutting position and to bear on said blade when it is in a cutting position.
2. The invention according to claim 1 in which said pivotal wheel is mounted equidistant from each of said spaced wheels.
3. The invention according to claim 1 in which said engine is positioned for even distribution of its weight on said arbor.
4. The invention according to claim 1 including means for pivotally mounting said engine forwardly of said carriage whereby raising and lowering of said engine effects forward and rearward tilting of said engine on its pivotal mount.
5. The invention according to claim 1 in which said saw blade is mounted to operate in a cutting position in the vicinity of the axis of rotation of said first wheel means.
6. The invention according to claim 1 including:
a lever;
a fulcrum for said lever rigidly connected to said carriage;

means for connecting said lever to said engine whereby turning said lever on said fulcrum vertically moves said engine to raise or lower said saw blade.

7. The invention according to claim 6 including means for securing said lever in one of a plurality of positions with respect to said fulcrum whereby to define a desired cutting position.

8. The invention according to claim 6 including a handle secured upright from said carriage, said fulcrum being rigidly secured between said handle and said carriage.

9. The invention according to claim 1 including a hollow handle secured to said carriage, means at one end of said handle for receiving cooling liquid therein, and means at the other end of said handle for conducting said cooling liquid to said saw blade.

* * * * *